Figure 1:
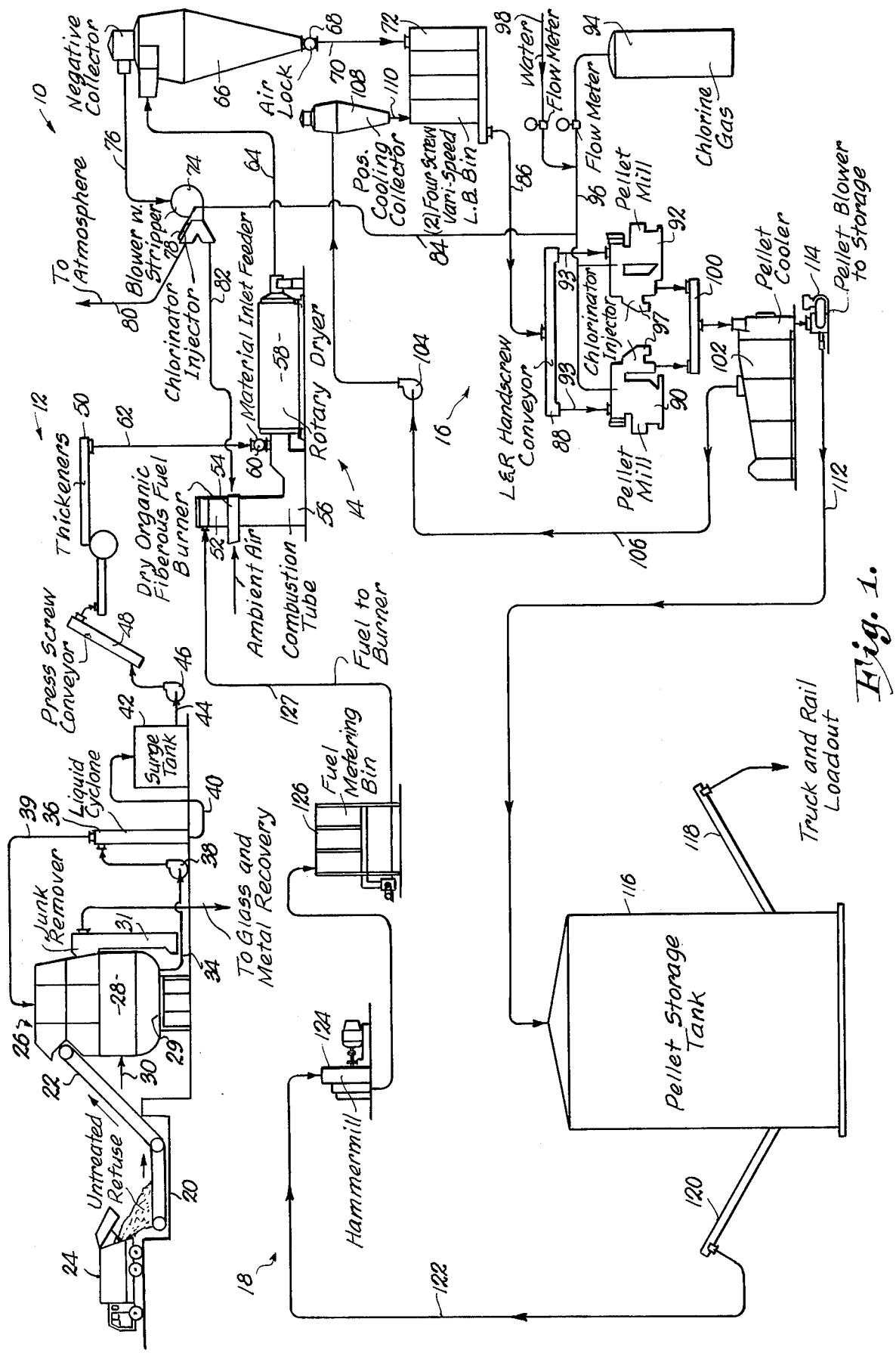

United States Patent [19]

Livingston

[11] 4,026,678
[45] May 31, 1977

[54] PROCESS FOR TREATING MUNICIPAL WASTES TO PRODUCE A FUEL

[75] Inventor: Andrew D. Livingston, Independence, Kans.

[73] Assignee: Guaranty Performance Co., Inc., Independence, Kans.

[22] Filed: Dec. 17, 1975

[21] Appl. No.: 641,629

[52] U.S. Cl. .................................. 44/1 D; 44/10 R
[51] Int. Cl.² .......................................... C10L 5/00
[58] Field of Search .................. 44/1 R, 1 D, 10 R; 110/8 R, 8 C

[56] References Cited
UNITED STATES PATENTS

| | | | |
|---|---|---|---|
| 3,304,991 | 2/1967 | Greenfield | 44/1 R |
| 3,506,414 | 4/1970 | Skendrovic | 44/1 R |
| 3,830,636 | 8/1974 | Marsh | 44/1 D |

*Primary Examiner*—Carl F. Dees
*Attorney, Agent, or Firm*—Schmidt, Johnson, Hovey & Williams

[57] ABSTRACT

A method for converting wastes, particularly municipal solid wastes, into usable low cost fuel is provided which yields discrete, substantially self-sustaining fuel pellets which can be easily shipped and stored in bulk and used by utilities or factories as a replacement for coal or other hydrocarbon fuels. The method includes the steps of pulping and fiberizing collected solid wastes followed by air convection drying and pelletizing thereof within relatively narrow temperature and moisture ranges which have been found to be especially conducive to the production of dense, self-sustaining fuel pellets. Treatment in this manner causes the fibrous organic materials such as paper and cloth in the collected wastes to serve as a type of adhesive binder for holding the pelletized product together and minimizing undesirable high volume, low density fines in the product. In the preferred process, the waste materials are treated continuously and a fraction of the resultant fuel is returned to the process for use in powering the process dryer.

11 Claims, 1 Drawing Figure

PROCESS FOR TREATING MUNICIPAL WASTES TO PRODUCE A FUEL

This invention relates to a process for producing a pelletized fuel from non-sewage solid wastes such as that collected by municipalities. More particularly, it is concerned with such a method and product wherein process conditions of temperature and moisture level are maintained within relatively narrow ranges for ensuring that the final product is produced in a dense, self-sustaining pelletized form which can be easily shaped, stored and handled.

In recent years, increasingly stringent government regulations have made it imperative that cities and factories find new ways of disposing of wastes such as paper, cloth, metals and other solid non-sewage refuse. In the past, it has been the traditional practice to simply dump or bury such solid wastes, but this is objectionable both from an aesthetic and an environmental standpoint.

In addition, it has long been recognized that solid wastes have potential value as a source of fuel, since many of the components thereof have substantial B.T.U. values. This fact has taken on increasing significance of late by virtue of the high cost of traditional hydrocarbon fuels and the possibility of facing a shortage of such fuels. Therefore, many workers in the art of solid waste disposal have recognized the potential advantages which inhere in the use of wastes, and particularly municipal non-sewage wastes, as a fuel source to power utilities or industrial plants.

In practice however, attempts at using municipal solid wastes as a source of fuel have met with a number of heretofore unresolved difficulties. First of all, a problem arises by virtue of the nature of collected municipal wastes, which may consist of a wide variety of diverse materials, some of which can be used as a fuel while others cannot. Furthermore, the relatively low density of collected municipal wastes makes it impractical to handle this material for burning directly, even if this were otherwise feasible. In view of this fact, it has been known to compact or otherwise treat municipal wastes in a manner calculated to increase the usability thereof as a fuel. However, no really successful method of processing such solid wastes on a large scale has been devised, either because processing costs are prohibitive or by virtue of the fact that the resultant product does not justify the processing expense.

It is therefore the most important object of the present invention to provide a method of treating solid wastes, and particularly municipal non-sewage solid wastes, to produce a fuel product usable as a substitute for coal or other traditional hydrocarbon fuels, and which can be produced in volume at a relatively low cost and yield a final product in the form of dense, substantially discrete bodies such as cylindrical pellets which can easily be shipped, stored and comminuted for use as a fuel.

As a corollary to the foregoing, another object of the invention is to provide a method wherein collected wastes containing at least about 15% by weight of organic materials capable of being fiberized are treated to yield a fiberized, pulp-like mixture, whereupon the latter is treated to give an air-fluidized stream which is maintained within relatively narrow ranges of temperature and moisture content in order that the fiberized organic materials in the stream can serve as type of adhesive binder for ensuring that compressed bodies of the fuel remain substantially self-sustaining prior to use thereof.

Another object of the invention is to provide a method of the type described wherein the pulped wastes containing fiberized organic material are maintained at a temperature within the range of from about 130° to 180° F., and a moisture content within the range of from about 20% to 35% by weight, during the collection and pellet-forming stage of the process in order that natural adhesives in the fiberized organic materials can serve as an effective binder for the fuel pellets ultimately produced.

A still further object of the invention is to provide a continuous method of forming fuel products from non-sewage solid wastes wherein at least a fraction of the fuel produced is used to power the process dryer so that the energy costs attendant production of the fuel product are substantially minimized.

The single FIGURE is a essentially schematic representation of the equipment and process steps followed in the preferred form of the present invention.

Municipal solid waste, or MSW as it is commonly abbreviated, is usually defined to include household and commercial (but not industrial) refuse, as well as refuse from alleys, streets, trees, landscaping, parks, beaches and catch basins. The volume of MSW generated each year in the United States amounts to about 0.55 tons of refuse per person, which as can be appreciated represents a tremendous quantity of waste. Although the actual composition of refuse varies widely between locations or communities and by seasons, days, and loads received at a collection-disposal site, nevertheless an overall average composition has been determined and this is set forth in the following table:

TABLE

| Constituent | Weight % |
| --- | --- |
| Paper | 37.0 |
| Glass | 9.0 |
| Ferrous metals | 7.6 |
| Nonferrous metals | 0.8 |
| Plastics | 1.4 |
| Leather, rubber, textiles and wood | 6.0 |
| Garbage and yard waste | 10.0 |
| Moisture | 25.0 |
| Miscellaneous | 3.2 |
| Total | 100.0% |

As can be seen from the foregoing, this average composition of MSW contains on the order of 50% organic materials capable of being fiberized (i.e., paper, textiles, wood, garbage and yard wastes). In addition, the calculated gross heat value of this average waste material is approximately 4700 Btu/lb. Hence, as will be explained hereinafter, the average MSW collected in the United States is eminently suited for processing accordance with the invention.

Turning now to the Figure, the overall apparatus 10 used in the process of the invention includes the primary collection and treatment section 12, a dryer 14, a separation and forming stage 16, and a product recovery and recycling section 18. Raw untreated refuse is collected in primary section 12 and is passed in serial order through the remaining parts of the apparatus for producing the ultimate end product, as will be seen from a study of the flow lines in the Figure.

In more detail, section 12 of apparatus 10 includes an initial pickup and transfer station 20 which is schematically represented in the figure as including conventional conveyor structure 22 which serves to transport refuse from delivery truck 24 to the top of a relatively large pulping unit 26. The latter includes an upright tub 28 having a perforated bottom plate 29, a water inlet 30 and central high speed cutting blade (not shown) for wet-pulping and comminuting the pulpable refuse, and fiberizing organic materials such as paper and cloth within the refuse to produce a slurry-like mixture. Pulping unit 26 is preferably of the type sold by the Black-Clawson Company of New York, N.Y. under the designation "Hydrapulper", and further information pertaining to the construction and operation of this type of unit can be obtained from a booklet published by The U.S. Enviromental Protection Agency under the title *Recovering Resources From Solid Waste Using Wet-Processing*.

Pulping unit 26 is also equipped with a conventional bucket elevator type junk remover 31 which is operable for successively removing large pieces of metal, cans and other nonpulpable materials from the water slurry formed in unit 26. The glass, metal and other materials separated by junk remover 30 are transferred via line 32 to known types of recovery stations therefor.

A line 34 extends from the bottom of tank 28 to the top of a liquid cyclone 36. A pump 38 is interposed in line 34 for the purpose of pumping the slurry from the bottom of 26 to he cyclone 36. Cyclone 36 is operable for centrifugally separating a portion of the liquid of the incoming pulp-like slurry and the fiberized materials therein. The liquid fraction is returned through line 39 to pulping unit 26, while the fiberized solids (which may also contain small fragments of glass, metal, plastics and the like) are diverted through bottom line 40 to surge tank 42.

The pulped material collected within tank 42 is conveyed through line 44 and pump 46 to a dewatering section which advantageously includes press screw conveyor 48 and a secondary centrifugal thickening unit 50. Conveyor 48 and unit 50 serve merely to further dewater the solid-water mixture from cyclone 36, and it will be appreciated that any one of a number of known dewatering devices could be used for this purpose. The pulped material resulting from the dewatering step is in the form of a moisture laden agglomeration (most preferably about 50% by weight water) having substantial quantitites of fiberized organics therein, and usually containing small fragments of metal, plastics, glass and the like which escaped separation in pulping unit 26.

Dryer 14 is a commercially available hot air suspension-convection rotary drum dryer and includes a burner 52 which is capable of burning dry organic fiberized fuel, an ambient air inlet 54, a combustion tube 56, an internally flighted rotary drum 58 and a product inlet 60. Dryer 14 is operable to separate, fluff, sterilize and air-fluidize at temperatures over 212° F., the agglomerated, dewatered waste material coming from the dewatering station via line 62. In addition, the drying conditions within dryer 14 should be maintained within relatively narrow limits so that the air-fluidized stream of material leaving the same through line 64 is at a temperature of from about 130°-180° F., with the solids fraction in the stream comprising from about 20% -35% by weight moisture. As indicated, it has been determined that maintenance of these conditions is important in producing discrete, self-sustaining fuel pellets.

The product in line 64 enters a conventional negative pressure collector 66 which serves to separate the solids fraction of the air-fluidized stream and deliver the same through air lock 68 and line 70 to live bottom surge bin 72. Collector 66 is powered by a blower-stripper 74 through line 76, and the output of the collector is fed through the blower-stripper 74 as shown where any particulate matter remaining in the air is mechanically separated in the known manner. Blower-stripper 74 also includes a chlorine injector 78 (which is fed by line 84) for deodorizing the air discharged to the atmosphere via line 80. The particulates collected by blower-stripper 74 are fed through line 82 to dryer 14 for recycling through the collection system. This serves to minimize objectionable particulate emissions from the overall apparatus 10.

Surge bin 72 is of the well-known live bottom variety and includes four variable speed screws (not shown) for agitating the collected solid fraction delivered to the bin and ensuring that the solids do not build up within the bin. A line 86 extends from the bottom of bin 72 to a dual screw conveyor assembly 88 which in turn feeds to a pair of adjacent, identical pellet mills 90 and 92 through feed lines 93. The mills are of conventional construction, and in practice pellet mills sold by the Sprout-Waldron Company have proven to be adequate. Collection and forming stage 16 also includes a supply of chlorine gas 94 having a line 96 connected thereto and extending to the chlorine injectors 97 of the respective pellet mills 90 and 92 for deodorizing the pellets produced in the latter. A water line 98 is also provided for mixing with the chlorine gas from source 94 prior to injection thereof into the pellet mills. As will also be seen from the Figure, chlorine feed line 84 discussed above is connected to line 96 downstream of the connection of water line 98 for providing a source of chlorine for blower-stripper 74.

The output from the respective pellet mills 90 and 92 is fed into an intermediate collection unit 100, which in turn is connected to a conventional negative pressure pellet cooler 102. The latter is cooled by a blower 104 interposed in line 106 which serves to draw air through the pellets within the cooler 102. In addition, any fines within cooler 102 are returned through line 106 to a positive pressure collector 108 of the cyclone variety which collects the fine and delivers the same through bottom line 110 to surge bin 72.

The output from pellet cooler 102 is fed through line 112 and pneumatic blower 114 to pellet storage tank 116. The latter is designed to facilitate ventilation and prevention of condensation within the tank, and includes loadout apparatus 118 for permitting loading of trucks or railroad cars with the pelletized fuel product.

In the preferred form of the invention, a fraction of the pelletized fueld product is recycled back to burner 52 of dryer 14 in order to power the latter. In this connection, a loadout apparatus 120 is connected to tank 116 and has a line 122 connected thereto. A conventional hammermill 124 is interposed within line 122 along with a fuel metering bin 126. In use, sufficient fuel is taken from tank 116 and passed through hammermill 124 for comminuting the same whereupon the particulate fuel passes through bin 126 and into burner 52 by way of line 127.

In the practice of the present invention, it has been determined that certain conditions must be met in order to produce an acceptable, commercially salable product. For example, the initial untreated waste materials collected may include a variety of constituents such as glass, metals and other noncombustible materials, but should include at least about 15% by weight of organic material capable of being fiberized, such as paper or cloth. Although there is no upper limit on the amount of fiberizable material which can be present, below about 15% by weight of such material it is difficult to form the refuse into discrete, self-sustaining pellets or bodies.

The waste material leaving primary collection and treatment section 12 of apparatus 10 should comprise a substantially homogeneous pulp-like mixture having from about 20% to 70% by weight moisture and preferably about 20% by weight of fiberized organic material. In this connection, treatment of the waste in pulping unit 26 with water creates a slurry which is pressed through the perforated bottom of tub 28 by the rotary blade within the latter, and this material is then fed through liquid cyclone 36 and the described dewatering apparatus. In practice with average waste loads, the minimal standards of moisture and fiberized organic material content described above can be met without difficulty. In more preferred forms, the pulp-like mixture in line 62 should include from about 40% to 60% by weight moisture and at least about 30% by weight of fiberized organic material.

The function of dryer 14 is to separate, fluff, sterilize, partially dry and air-fluidize the agglomerated material leaving primary section 12. In this regard dryer 14 is of essentially conventional construction but the burner thereof is preferably modified in order to permit burning of the pelletized fuel product produced by the present method. Dryer 14 is also important for creating an air-fluidized stream of the waste material in exit line 64 which is fed to collector 66 as described. In this respect it is important that the air-fluidized stream be at a temperature within the range of from about 130° to 180° F. with the solids fraction including the fiberized materials comprising from about 20% to 35% by weight moisture. It has been found that these conditions are most conducive to formation of discrete pellets in the process by causing the natural adhesives and moisture in the fiberized materials to come to the surface thereof in order to create an effective binder for the pellets. In more preferred forms of the invention, the air-fluidized stream should be maintained at a temperature of from about 150° to 160° F. and the solids fraction should include from about 22% to 25% by weight moisture. The air-fluidized stream will in general be at least about 90% by weight gas (including water vapor), with the remainder being the solids fraction.

The product leaving collector 66 via line 70 is a fluffed, separated, sterilized solid having a density of about 3 to 5 lbs/cu. ft. which passes through live bottom bin 72 and into pellet mills 90 and 92. In this connection it is very important to maintain the solids product entering the pellet mills at a temperature within the range of about 130° to 180° F. (more preferably 150°–160° F.) and the solids fraction having a moisture content within the range of from about 20% to 35% by weight (more preferably 22% to 25%) during the period between leaving the dryer 14 and pelletizing. This is generally done by ensuring that the time lapse between drying and pelletizing is kept at a minimum, but other means could also be employed. In addition, the content of fiberized organic materials in the solid fraction should be at a level of at least about 15% by weight, and more preferably at least about 35% by weight. However, there is no upper limit on the amount of fiberized material in the solids fraction.

The pelletized product leaving cooler 102 is in the form of compressed, self-sustaining bodies with the mass thereof including at least about 30% by weight of fiberized organic material and up to about 15% by weight moisture. In more preferred forms, the mass includes over 50% of fiberized organic materials and has a density of at least 30 lbs/cu.ft. As shown in the Figure, chlorine is preferably injected into the pellet mills during production of the cylindrical fuel pellets in order to sterilize and deodorize the same.

The following example will illustrate the process of the present invention, but nothing therein is to be taken as a limitation on the scope of the invention.

EXAMPLE

A quantity of collected refuse containing about 18% glass and assorted metals, 25% water, 2% non-combustible material, 3% combustible non-fibrous organic materials and 42% combustible fibrous organic materials is treated by the method in accordance with the invention, using apparatus of the type depicted in the Figure.

The collected refuse is fed to a Black-Clawson Hydrapulper along with approximately 24 pounds of water per each 100 pounds of refuse, and a pulped and fiberized slurry of the water and refuse is produced by the action of the rotating blade against the perforated bottom plate of the pulper. A large proportion of the glass and metal fraction in the refuse is recovered by the bucket elevator junk remover on the pulping unit and this is separated from the remainder of the refuse. The underflow from the Hydrapulper containing an aqueous slurry of pulped, fiberized organic materials and other unseparated components, is fed in serial order through a liquid cyclone, surge tank and press-type dewatering apparatus in order to remove a proportion of the water initially added in the hydrapulper. The agglomerated wet product remaining after these steps comprises approximately 2% glass and metals, 50% water, 2% non-combustible materials, 3% combustible non-fibrous organic materials and 43% combustible fiberized organic materials.

The wet agglomeration is then directed to a rotating drum, hot air convection, product suspension dryer of the type illustrated in the Figure whereupon the material is fluffed, separated and sterilized with the fuel gasses in the dryer initially being at a temperature on the order of 700° F. The output of the rotary dryer in the form of an air-fluidized stream containing a solids fraction which includes the fiberized and non-fiberized input to the dryer. This air-fluidized stream is at a temperature of about 150° F. and contains approximately 7.5% solids (including moisture), and 92.5% gas (including water vapor).

The air-fluidized stream is next directed to a cyclone type air-solid negative pressure separator wherein the solids fraction is collected and fed to a surge bin. The collected solids include approximately 3% glass and metals, 20% water, 4% non-combustible material, 5% combustible non-fibrous organic material, and 68% combustible fiberized organic material. This collected product has a density of approximately 3–5 lbs/cu.ft. and is maintained in a live bottom surge bin for ensuring even flow of material to the pelleting stage.

The collected solids are next directed to conventional Sprout-Waldron pellet mills while remaining substantially at 150° F. and 20% by weight moisture, whereupon they are compacted in the well-known manner to present substantially discrete, cylindrical fuel pellets. The latter are then directed to a negative pressure pellet cooler with the fines being collected and returned to the live bottom bin for further treatment. The pellet cooler lowers the temperature of the compacted pellets to approximately ambient, and the pellets include about 3% glass and metals, 15% water, 4% non-combustible materials, 5% combustible non-fibrous organic materials, and 73% combustible fiberized organic materials. This final product is fed to a ventilated collection bin whereupon it is ready for sale or use. The product has a gross heat value on the order of 8000 Btu/lb.

Having thus described the invention, what is claimed as new and desired to be secured by letters Patent is:

1. A process for treating wastes to produce a fuel product therefrom, said process comprising the steps of:
    collecting a quantity of solid waste material comprising at least about 15% by weight of organic material capable of being fiberized;
    treating said waste material to fiberize at least a portion of said organic material and create a substantially homogeneous pulp-like mixture containing the same and having from about 20% to 70% by weight moisture;
    producing an air-fluidized stream of said mixture having a temperature of from about 130° to 180° F. and including a solids fraction having said fiberized material therein, said solids fraction having a moisture content sufficient to enhance the adhesive properties of said fiberized material;
    collecting said solids fraction while maintaining said moisture content of said solids fraction, the temperature of the solids fraction within the range of from about 130° to 180° F., and the content of fiberized organic materials at a level of at least about 15% by weight; and
    forming said collected solids fraction into self-sustaining bodies.

2. The process as set forth in claim 1 including, during said treating step, the steps of pulping said collected waste material, removing at least a portion of any non-pulpable solids present therein, and removing at least a portion of the water from the pulped waste material.

3. The process as set forth in claim 1 including the steps of drying said pulp-like mixture while simultaneously producing said air-fluidized stream.

4. The process as set forth in claim 1 including, during said collecting and forming step, the steps of passing said air-fluidized stream through an air-solids separator, collecting the solids from said separator, and pelletizing the collected solids.

5. The process as set forth in claim 1 including the steps of cooling said self-sustaining bodies to approximately ambient temperature, and separating at least a portion of any fines remaining with said bodies.

6. The process as set forth in claim 1 wherein said air-fluidized stream is produced in a dryer, and including the step of transferring at least a fraction of the self-sustaining bodies produced to said dryer for providing fuel for the latter.

7. The process as set forth in claim 1 including the step of injecting chlorine into said solids fraction during said collecting and forming step.

8. The process as set forth in claim 1 wherein said waste material comprises at least about 35% of organic material capable of being fiberized.

9. The process as set forth in claim 1 wherein said pulp-like mixture is from about 40% to 60% by weight moisture and at least about 30% by weight fiberized organic material.

10. The process as set forth in claim 9 wherein said air-fluidized stream is at a temperature of from about 150° to 160° F. and includes a solids fraction comprising from about 22% to 25% by weight moisture.

11. The process as set forth in claim 1 wherein said solids fraction has a moisture content of from about 20% to 35% by weight moisture.

* * * * *